(12) United States Patent
Kingsford et al.

(10) Patent No.: US 6,837,484 B2
(45) Date of Patent: Jan. 4, 2005

(54) ANTI-PUMPING DISPENSE VALVE

(75) Inventors: Kenji A. Kingsford, Devore, CA (US); Mario Fregoso, Whittier, CA (US); Raymond T. Savard, Pilot Point, TX (US)

(73) Assignee: Saint-Gobain Performance Plastics, Inc., Wayne, NJ (US)

( * ) Notice: Subject to any disclaimer, the term of this patent is extended or adjusted under 35 U.S.C. 154(b) by 83 days.

(21) Appl. No.: 10/192,028

(22) Filed: Jul. 10, 2002

(65) Prior Publication Data

US 2004/0007686 A1 Jan. 15, 2004

(51) Int. Cl.$^7$ ................................................ F16K 7/00
(52) U.S. Cl. ...................................... 251/331; 251/324
(58) Field of Search ................................ 251/318–336

(56) References Cited

U.S. PATENT DOCUMENTS

| | | | |
|---|---|---|---|
| 6,000,416 A | * 12/1999 | Kingsford et al. | ............. 137/1 |
| 6,196,523 B1 | * 3/2001 | Miyata et al. | ............. 251/276 |
| 6,349,858 B1 | * 2/2002 | Kingsford et al. | ....... 222/400.7 |

* cited by examiner

Primary Examiner—Paul J. Hirsch
(74) Attorney, Agent, or Firm—Jeffer, Mangels, Butler & Marmaro LLP

(57) ABSTRACT

Anti-pumping dispense valves, constructed according to principles of this invention, comprise a fluid transport housing having a fluid inlet passage extending into the housing, a fluid outlet passage extending out of the housing, and a fluid transport chamber disposed within the housing. The fluid transport chamber includes an valve seat. An actuator housing is attached to the fluid transport housing and includes an actuator chamber that is in contact with the fluid transport chambers. A diaphragm/poppet assembly is disposed within the fluid transport chamber and comprises a poppet positioned downstream of the seat for placement against the seat to stop fluid flow through the first fluid transport chamber. An actuator is disposed within the actuator chamber for moving the diaphragm/poppet assembly. Dispense valves of this invention operate to provide a slight vacuum within the fluid flow passageway in the valve to retain or pull back into the valve any nondispensed liquid, thereby eliminating and/or greatly reducing the possibility product contamination via unwanted excess liquid dispensement or dried residual liquid dispensement.

18 Claims, 5 Drawing Sheets

US 6,837,484 B2

ANTI-PUMPING DISPENSE VALVE

FIELD OF THE INVENTION

This invention relates to fluid handling valves used for dispensing liquids and, more particularly, to fluid handling valves that are specially designed to repeatably dispense accurate volumes of chemically aggressive and/or chemically pure liquids without degrading or otherwise deleteriously affecting the liquids or the manufactured product.

BACKGROUND OF THE INVENTION

Fluid handling valves, e.g., fluid dispense valves, are used in applications where the valve internals are subjected to corrosive acidic or caustic liquids, or where the purity of the liquids which flow through the valve must be maintained. An example of such application is the semiconductor manufacturing industry where the process chemical delivered through such a valve must maintain a high degree of chemical purity to avoid contamination that may occur on the microscopic level, and that is know to cause damage to the manufactured product, e.g., a semiconductor wafer.

It is also desired, during certain process steps, that a precise amount of the process chemical be deposited onto the product. It is, therefore, important that a dispense valve used to perform such function be capable of repeatably dispensing an accurate volume of the process liquid without dribbling excess liquid onto the product after the valve has been shut. It is, however, known in the industry that dispense valves used to perform this function do not always terminate the dispensement of liquid after the valve is closed or shut.

For example, conventional dispense valves used in this capacity are known to cavitate and/or seep out a small volume of liquid after the valve has been closed. This extra volume of liquid is either dispensed from the valve onto the product, providing an undesired excess of the delivered liquid, or is retained within the outlet port of the valve or the ultimate delivery device, e.g., a pipe or nozzle. In the case where the excess liquid is retained within the valve, this situation too presents a problem because the liquid can dry near the tip of the ultimate delivery device. The dried portion of liquid can then be dispensed onto a product the next time that a volume of the process liquid is delivered from the dispensing valve. Delivery of such dried portion of the liquid onto the product is known to cause damage to the product and, thus, is not desired.

It is, therefore, desired that a dispense valve be designed in such a manner so as to control and/or eliminate the potential for liquid cavitation and/or excess liquid seepage and/or delivery once the valve has been shut or closed. It is also desired that such a dispense valve be configured to enable its operation with chemically aggressive and/or pure liquids without degrading or otherwise functioning in a manner that could introduce contaminate material into the liquid. It is further desired that such dispense valve be constructed in a manner so as to reduce the number of liquid leak paths therethrough, thereby reducing the possibility of chemical leakage to the outside environment.

SUMMARY OF THE INVENTION

Anti-pumping dispense valves, constructed according to principles of this invention, can be configured having at least two different embodiments. A first dispense valve embodiment comprises a fluid transport housing having fluid inlet and outlet passages, and a fluid transport chamber interposed therebetween. The fluid transport chamber includes a valve seat.

An actuator housing is attached to the fluid transport housing and includes an internal actuator chamber that is in contact with the fluid transport chamber. A diaphragm/poppet assembly is disposed within the fluid transport chamber and includes a poppet that is positioned downstream of the seat for placement thereagainst to control the flow of fluid through the valve. The poppet is intentionally positioned downstream from the seat so that the actuating movement necessary to place the poppet against the seat causes a volume decrease in that portion of the fluid transpott housing downstream of the seat. This volume reduction upon valve closing operates to provide a slight suction effect within the portion of the valve downstream from the valve seat, thereby serving to retain any undispensed liquid within the valve.

A second dispense valve embodiment comprises a fluid transport housing having a fluid inlet passage extending into the housing, a fluid outlet passage extending out of the housing, and first and second serially-arranged fluid transport chambers disposed within the housing. The second fluid transport chamber is positioned downstream of the first fluid transport chamber, and the first fluid transport chamber includes a valve seat.

An actuator housing is attached to the fluid transport housing and includes first and second actuator chambers that are in contact with respective first and second fluid transport chambers. A diaphragm/poppet assembly is disposed within the first fluid transport chamber and comprises a poppet positioned downstream of the valve seat for placement against the seat to control fluid flow through the first fluid transport chamber.

Means are disposed within the second fluid transport chamber for changing the volume of the second fluid transport chamber, e.g., increasing the volume of the second fluid transport chamber. An actuator means is disposed within each first and second actuator chambers for moving the respective poppet/diaphragm assembly and means for changing volume.

Dispense valves of this invention are referred to as an "anti-pumping" valves because the closing movement of the poppet (in the first dispense valve embodiment), and the combined movement of the poppet and the means for controlling volume (in the second dispense valve embodiment) do not operate to push or "pump" and additional and unwanted volume of liquid from the valve after it has been closed. Rather the poppet and/or means for controlling volume each operate to provide a slight vacuum within the fluid flow passageways of the respective valves to retain or pull back into the valve any nondispensed liquid. This operation is desired as it eliminates and/or greatly reduces the possibility for product contamination via unwanted excess liquid dispensement or dried residual liquid dispensement.

DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

Dispense valves constructed in accordance with the practice of this invention comprise a one-piece diaphragm/poppet assembly that is positioned within a valve housing. The diaphragm/poppet assembly is configured having a poppet positioned in a sealing position downstream of a valve seat disposed within a fluid transport chamber through the housing. Configured in this manner, the diaphragm/poppet assembly serves to control and/or eliminate the undesired cavitation and/or seepage of liquid from the valve after it has been placed into a closed or shut position.

Dispense valves of this invention can include, in addition to the above-described diaphragm/poppet assembly, a second diaphragm disposed within a second fluid transport chamber through the housing, downstream from the diaphragm/poppet assembly. The second diaphragm is actuated in conjunction with the diaphragm/poppet assembly to reduce the volume of the second fluid transport chamber to thereby retain any liquid downstream of the diaphragm/poppet assembly within the valve after the valve has been placed into a closed position. Dispense valves of this invention include wetted parts that are formed from fluoropolymeric materials to resist undesired degradation from exposure Co chemically aggressive process liquids.

Figure 1:
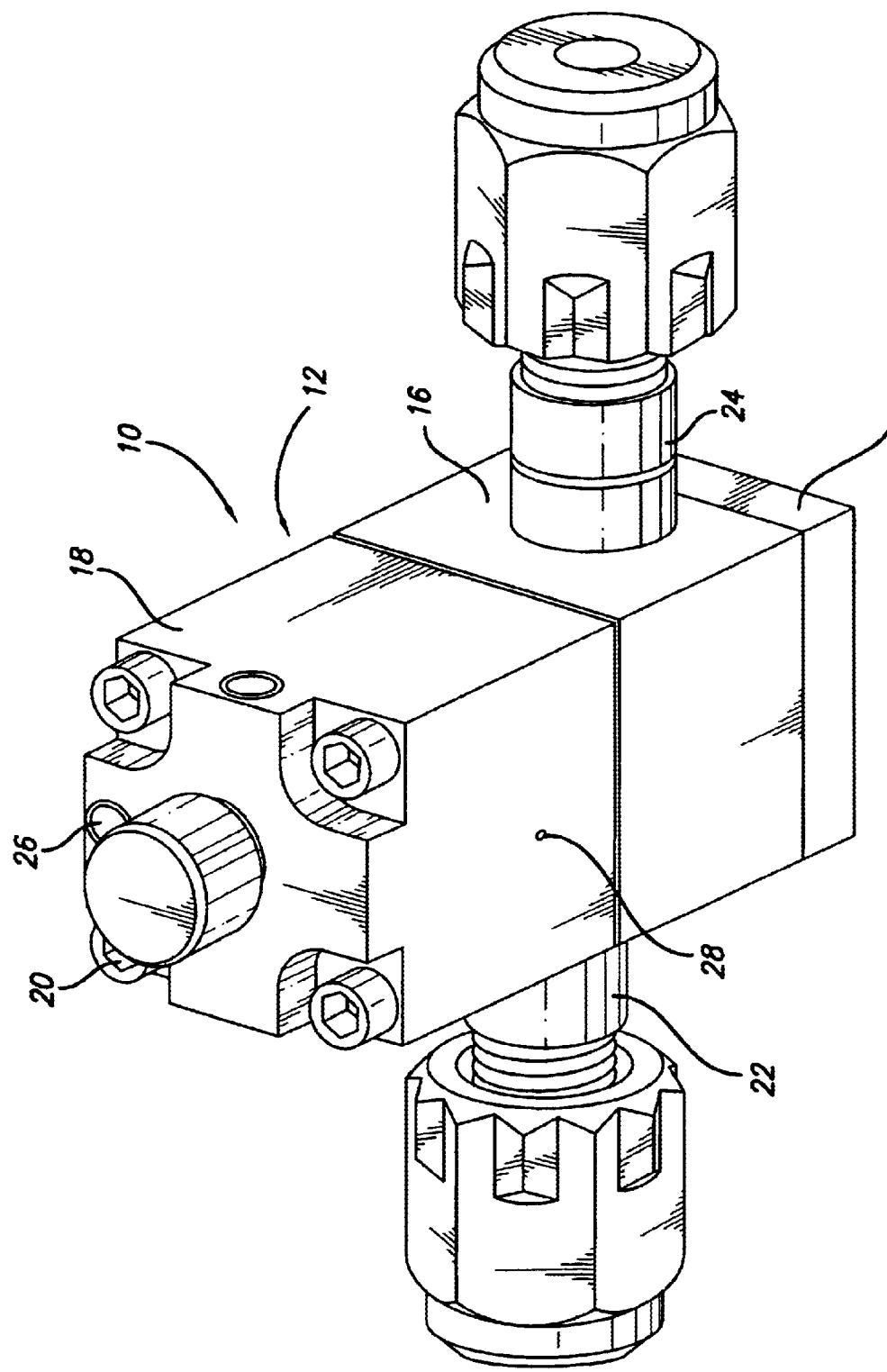
FIG. 1 is a perspective view of a first embodiment dispense valve constructed according to principles of the present invention.

Referring to FIG. 1, a first embodiment dispense valve 10 provided in accordance with practice of the present invention comprises a valve body 12 made up of, moving from the bottom of FIG. 1 upwardly, a base 14, a fluid transport housing (FTH) 16 disposed on top of the base 14, and an actuator housing 18 disposed on top of the FTH 16. Screws 20, or other suitable attachment means, extend through the actuator housing 18 and the FTH 16, and are threaded into the base 14 to attach the actuator housing 18 and FTH 16 thereto.

The FTH 16 includes a fluid inlet port 22 through one of its side walls, and a fluid outlet port 24 through an opposite side wall. In an air- or pneumatically-actuated embodiment of the dispense valve 10, the actuator housing 18 includes an inlet air port 26 and an air outlet port or vent 28 extending through its side wall. The FTH may also be configured having a leak detection port (not shown) extending through one of its side walls to monitor the occurrence of any fluid leakage within the dispense valve.

Figure 2:
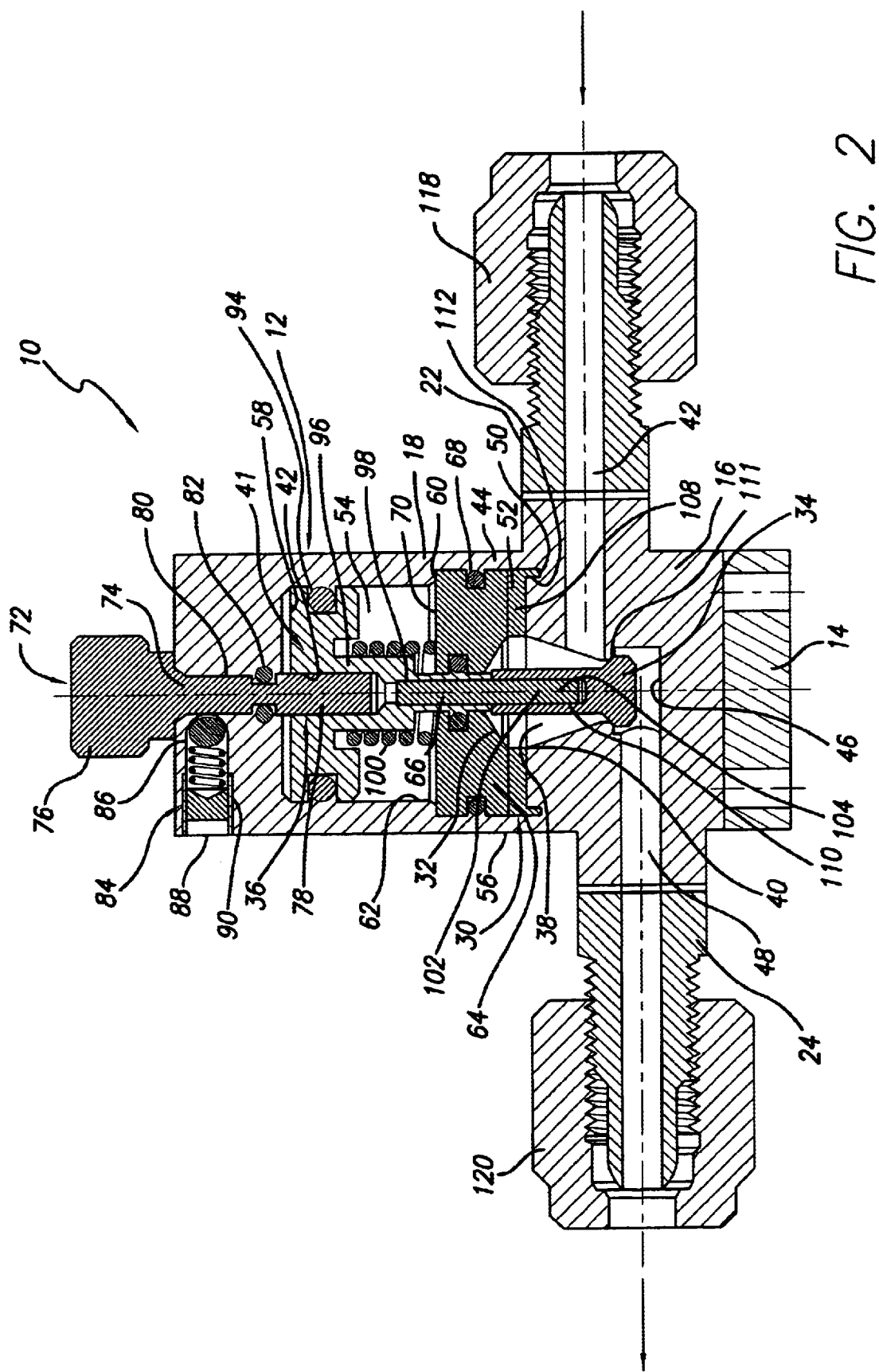
FIG. 2 is a cross-sectional side view of the dispense valve of FIG. 1 in a closed operating condition for controlling the displacement of fluid therethrough.
Figure 3:
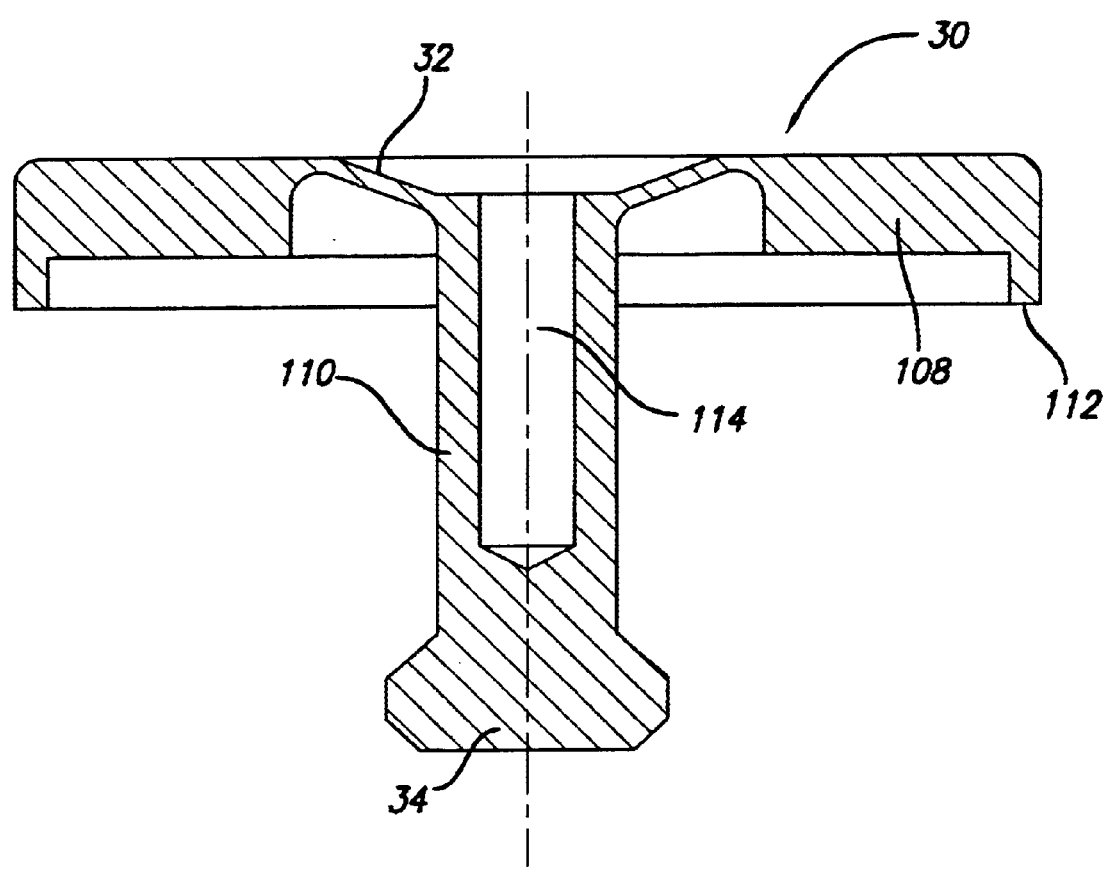
FIG. 3 is a cross-sectional side view of a diaphragm/poppet assembly taken from the valve apparatus of FIGS. 1 and 2.

As illustrated in FIGS. 2 and 3, and as discussed in greater detail below, a diaphragm/poppet assembly 30 is disposed within the FTH 16 and includes a movable diaphragm 32 at one of its ends, and an imperforate poppet 34 at its other end. The diaphragm/poppet assembly is attached to an actuator piston assembly 36 that is operated to move the diaphragm/poppet assembly axially within a fluid transport chamber 38 of the FTH 16. The poppet 34 is positioned downstream of a valve seat 40 positioned within the fluid transport chamber 38, and is designed to interact with the valve seat to control the displacement of fluid through the valve.

In a preferred embodiment, the dispense valve is designed having a pneumatically actuated diaphragm/poppet assembly. It is to be understood that the design of the dispense valve maybe changed, while not varying from the spirit of the invention, to accommodate other means of diaphragm/poppet assembly actuation, e.g., mechanical, solenoid, hydraulic actuating means and the like.

Referring to FIG. 2, the FTH 16 includes a fluid inlet passage 42 that extends from the fluid inlet port 22 through a side wall portion of the FTH and into the fluid transport chamber 38. The fluid transport chamber 38 extends through the FTH, perpendicular to the fluid inlet port, from an open end 44 of the FTH to an oppositely oriented base or close end 46 of the FTH. The fluid transport chamber 38 is generally conical in shape, having a reduced diameter moving from the open end 44 to the base 46. This shape, however, is understood to vary depending on the particular valve application. The FTH 16 includes a fluid outlet passage 48 that extends from the fluid outlet port 24 through a side wall portion of the FTH opposite the fluid inlet port and into the fluid transport chamber 38. The valve seat 40 is positioned within the fluid transport chamber between the fluid inlet and outlet passages 42 and 48. The valve seat 40 is defined circumferentially by a reduced diameter section of the fluid transport chamber.

The open end 44 of the FTH 16 comprises a groove 50 disposed circumferentially around a peripheral edge of a substantially flat FTH surface 52 that extends radially inwardly from the groove to the fluid transport chamber 38. The groove 50 is designed to accommodate a complementary tongue of the diaphragm/poppet assembly, as will be described in better detail below, to provide a leak-tight seal therebetween.

The FTH 16 can be formed from any type of structurally rigid material. In an example embodiment, where the dispense valve is for the purposes of dispensing process chemicals used in the application of semiconductor manufacturing, it is desired that the FTH be formed from a non-metallic material to avoid process liquid contamination. In such application, the FTH can be formed from conventional plastic or polymeric building materials such a polypropylene and the like. If desired, the FTH can be formed from a fluoropolymeric material selected from the group including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. In a preferred embodiment, the FTH is molded from polypropylene. Since the base 14 is not wetted by the process liquid, it can be made from a metallic material and, in a preferred embodiment for application with a semiconductor manufacturing process, is formed from stainless steel.

The actuator housing 18 is attached to the open end 44 of the FTH 16. The actuator housing includes a piston chamber 54 that extends axially therethrough from an open end 56, that interfaces with the FTH open end 44, to an oppositely-positioned partially-closed end 58 of the actuator housing. As mentioned above, the actuator housing includes, when adapted to provide pneumatically-actuated poppet assembly movement, an inlet air port 26 (see FIG. 1) and an outlet air port 28 (see FIG. 1) that each extend through an actuator housing side wall. Additionally, the actuator housing can be configured to provide leak detection via a leak detection port (not shown) extending through its side wall.

The piston chamber 54, in a preferred embodiment, has a circular radial cross section and includes both a first diameter section 60, that extends axially a distance from the actuator housing open end 56, and a smaller second diameter section 62 that extends axially from the first diameter section 60 to the partially-closed end 58 of the actuator housing. The piston chamber 54 is constructed in this manner to accommodate non-movable or immobile placement of a piston gland 64 therein. The actuator housing 18 can be formed from the same types of materials listed above for the FTH. However, since the actuator housing is not wetted by the process liquid routed through the valve it can be formed from a metallic material. In an example embodiment, the actuator housing is formed from stainless steel.

The piston gland 64 is used in applications where an air-actuated poppet assembly is desired to create an air-tight pressurizing chamber within the piston chamber. The piston gland 64 has a donut-shaped annular construction with a central opening 66 extending axially therethrough for accommodating placement of the actuator piston assembly 36 therein. The gland 64 includes an outside wall surface having a diameter that is sized for placement within the first diameter section 60 of the piston chamber. Axial displacement of the piston gland 64 in the piston chamber towards the partially-closed end 58 is restricted by interaction of the gland against the second diameter section 62. The gland 64 is sized axially so that, when loaded into the piston chamber, it makes contact with an adjacent surface of the diaphragm/poppet assembly to urge the same against the FTH 16. The piston gland 64 can be formed from the same types of materials listed above for the FTH and, in a preferred embodiment, is molded from polypropylene.

The piston gland 64 includes one or more annular seals around its outside diameter surface to form a leak-tight seal with the adjacent piston chamber wall surface. In a preferred embodiment, the gland includes a single annular seal 68, that extends circumferentially around its outside diameter and that is disposed within a groove. The piston gland also includes an annular seal 70 that extends circumferentially around the surface of the central opening 66 within a groove. The annular seal 70 forms an air-tight seal against the actuator piston assembly 36 to facilitate air-actuated piston movement. The annular seals used with the piston gland are preferably O-ring type seals formed from a material having desired properties of elasticity. Where chemical resistance is also desired, the O-ring seals may be made from Viton® or from other types of commercially available fluoropolymeric materials.

As mentioned briefly above, the actuator piston assembly 36 is disposed axially within the piston chamber 54. The actuator piston assembly 36 comprises a knob 72 at one of its axial end that extends lengthwise through an opening 74 in the partially-closed end 48. The knob includes a head 78 that projects outwardly from a top surface of the actuator housing 18, and that has a diameter sized greater than the opening 74. The knob 72 also includes a shaft 78 that extends axially inwardly into the actuator housing from the head. The shaft 78 is configured having a number of axially depending grooves 80 disposed therealong that are each positioned opposite the opening 74. A radial groove is positioned around the shaft axially adjacent the grooves 80, and is designed to accommodate an O-ring seal 82 therein for the purposes of providing a leak-tight seal between the knob and actuator housing. The actuator piston assembly can be formed from the same materials listed above for the FTH. However, since the actuator piston assembly is not wetted by the process liquid dispensed by the valve it can be formed from a metallic material. In an example embodiment, the actuating piston assembly is formed from stainless steel.

The axially depending grooves 80 are positioned along the shaft to cooperate with a detent assembly 84 that is disposed within an opening through a side wall portion of the actuator housing 18 perpendicular to the opening 74. The detent assembly 84 includes a ball 86 that is positioned to follow within one of the shaft's axially depending grooves 80, and is urged into such cooperation by use of a screw 88 and spring 90. The axially depending grooves 80 can each be configured having a different groove length for the purpose of providing a different shaft stroke length within the actuator housing.

So configured, the detent assembly 84 is used to guide and limit the shaft and actuator piston assembly movement within the actuator housing. The stroke length of the shaft and actuator piston is limited by registration of the detent ball 86 with the opposite axial ends of groove. In the event that a different stroke length, e.g., longer or shorter, is desired, the user can rotate the shaft so that the detent mechanism cooperates with a different axially depending groove on the shaft that is either longer or shorter and axial direction, respectively.

A piston 91 is attached to the portion of the actuator piston assembly shaft 78 extending into the piston chamber 54. The piston 91 generally performs two functions. A first piston function is to provide a leak-tight seal with the piston chamber to enable piston movement therein by pneumatic actuation. A second piston function is to make contact with the diaphragm/poppet assembly 30 to cause the poppet to interact with the valve seal 40. The piston 91 comprises a opening 92 disposed axially therethrough for accommodating placement of the actuator piston assembly shaft 78 therein. The piston 90 includes a first diameter section 94 having an outside diameter sized slightly smaller than the piston chamber second diameter section 62. The piston first diameter section includes an O-ring seal disposed circumferentially within a groove that provides a leak-tight seal between the piston chamber and the piston. The piston can be formed from the same types of materials discussed above for the FTH. In an example embodiment the piston is molded from polyvinyldifluoride (PVDF).

The piston 91 includes a second diameter section 96 that extends axially a distance away from the first diameter section 94, and that is sized smaller than the first diameter section. The piston 91 further includes a third diameter section 98 that extends axially a distance away from the second diameter section 96, and that is sized smaller than the second diameter section. The third diameter section 98 is disposed within the piston gland opening 66. A spring 100 is disposed within the piston chamber 54 and is disposed around the piston second diameter section 96. The spring is interposed axially between the piston first diameter section 94 at one spring end, and the piston gland 64 at an opposite spring end. Configured in this manner, the spring operates to urge the piston 91 away from the piston gland.

The actuator piston assembly 36 is attached to the diaphragm/poppet assembly 30 via the piston 91. Specifically, in a preferred embodiment, the piston 91 is attached to the diaphragm/poppet assembly 30 via a threaded stud 102 that is disposed within the opening 92 through the piston 91 and within a communicating opening 104 within the diaphragm/poppet assembly 30. Constructed in this manner, the diaphragm/poppet assembly remains attached to the actuator piston assembly during all reciprocating movement within the piston chamber. Although a threaded connection between the diaphragm/poppet assembly and actuator piston assembly has been described and illustrated, it is to be understood that alternative methods of attaching the two assemblies can be used are within the scope of this invention.

Referring to FIGS. 2 and 3, the diaphragm/poppet assembly 30 is disposed axially within the fluid transport chamber 38. The diaphragm/poppet assembly 30 is a one-piece assembly comprising a movable diaphragm 32 that is interposed between an integral disk-shaped mounting member 108, that extends radially outwardly from the diaphragm, and an integral shaft 110, that is located radially inwardly of the diaphragm and that projects axially a distance away from the diaphragm. The disk-shaped mounting member 108 includes a tongue 112 positioned along its peripheral edge that projects axially outwardly therefrom. The tongue 112 is sized having a thickness that is slightly greater than a width of the groove 50 along the open end 44 of the FTH 16, to provide a leak-tight interference fit therewith.

The diaphragm/poppet assembly includes a poppet 34 positioned at a terminal end of the shaft 110, and disposed within the fluid transport chamber downstream of the FTH valve seat 40. The poppet is configured having an enlarged diameter head portion, when compared to the shaft, that includes an angled or tapered outer surface that is configured to interact with the valve seat 40. In an example embodiment, the poppet head has a valve seat interface surface 111 that is tapered outwardly, moving from the shaft to the poppet head portion, at an angle of approximately 45 degrees.

The shaft 110 includes a hollow inside cavity 114 that extends from an opening through the diaphragm end of the assembly to a closed end prior to reaching the poppet 34. The cavity 114 is sized and configured to accommodate placement of the stud 102 therein for attachment of the diaphragm/poppet assembly to the actuator piston assembly 36. The cavity 114 does not extend completely through the shaft, thus providing a poppet that is imperforate for purposes of reducing the number of possible leak paths through the valve.

The diaphragm/poppet assembly can be formed from the same types of materials discussed above for the FTH. In an example embodiment, for use in the semiconductor manufacturing process with aggressive and high purity chemicals, it is desired that the diaphragm/poppet assembly be molded from a fluoropolymeric material, such as Teflon® PTFE, which is provided for example by DuPont Company of Wilmington, Del.

Referring still to FIG. 2, operation of the first embodiment dispense valve is as follows. The dispense valve 10 can be used with a fluid transport system by attaching the fluid inlet and fluid outlet ports 22 and 24 to respective fluid transport system coupling members 118 and 120. The coupling members can be used to connect the valve to conventional fluid transport piping, tubing, and the like. A source of process liquid, provided at a desired supply pressure, is routed to the valve and into the fluid transport chamber 38 via the fluid inlet port 22 and fluid inlet passage 42. As illustrated in FIG. 2, the dispense valve is configured in a fail-closed position so that, unless a sufficient pneumatic actuation pressure is directed into the piston chamber 54 between the piston 94 and the partially-closed end 58 of the actuator housing 18, the spring 100 acts to urge the poppet 34 against the valve seat 40 to prevent passage of the process liquid into the fluid outlet passage 48.

A pneumatic actuating pressure sufficient to overcome the spring force is directed into the piston chamber, causing the actuator piston assembly 36 to move axially within the chamber. The distance of the movement, or the stroke length, is controlled by cooperation of the detent mechanism 84 in one of the shaft axially depending grooves 80. The diaphragm/poppet assembly 30 is also moved axially by the actuator piston assembly 36, causing the poppet 34 to become unseated from the valve seat 40, and initiating the passage of liquid from the fluid transport chamber 38 into the fluid outlet passage 40 and out of the valve. The volume of liquid to be dispensed can be controlled by the actuator stroke length and/or the duration of actuating pressure provided to the valve. Once a desired volume has been dispensed by the valve, the actuating pressure is terminated, causing the spring force to move the poppet against the valve seat, thereby terminating the flow of liquid from the fluid transport chamber.

Configured in this manner, the first embodiment dispense valve helps to eliminate or reduce unwanted seepage or leakage of process liquid after the valve is placed in a closed position in the following manner. When placed in an open position, the downstream positioned poppet head projects a certain amount into the fluid outlet passage, thus displacing an equivalent volume of liquid within the passage. When the poppet is moved into a closed position the amount of the poppet placed in the fluid outlet passage is reduced, thereby creating an equivalent decrease in liquid volume within the passage. Because this liquid volume reduction in the fluid outlet passage occurs after the poppet interfaces with the seal and the valve is closed, this liquid volume reduction creates a suction effect on the passage that operates to keep any undispensed liquid in the fluid outlet passage and in the valve.

Figure 4:
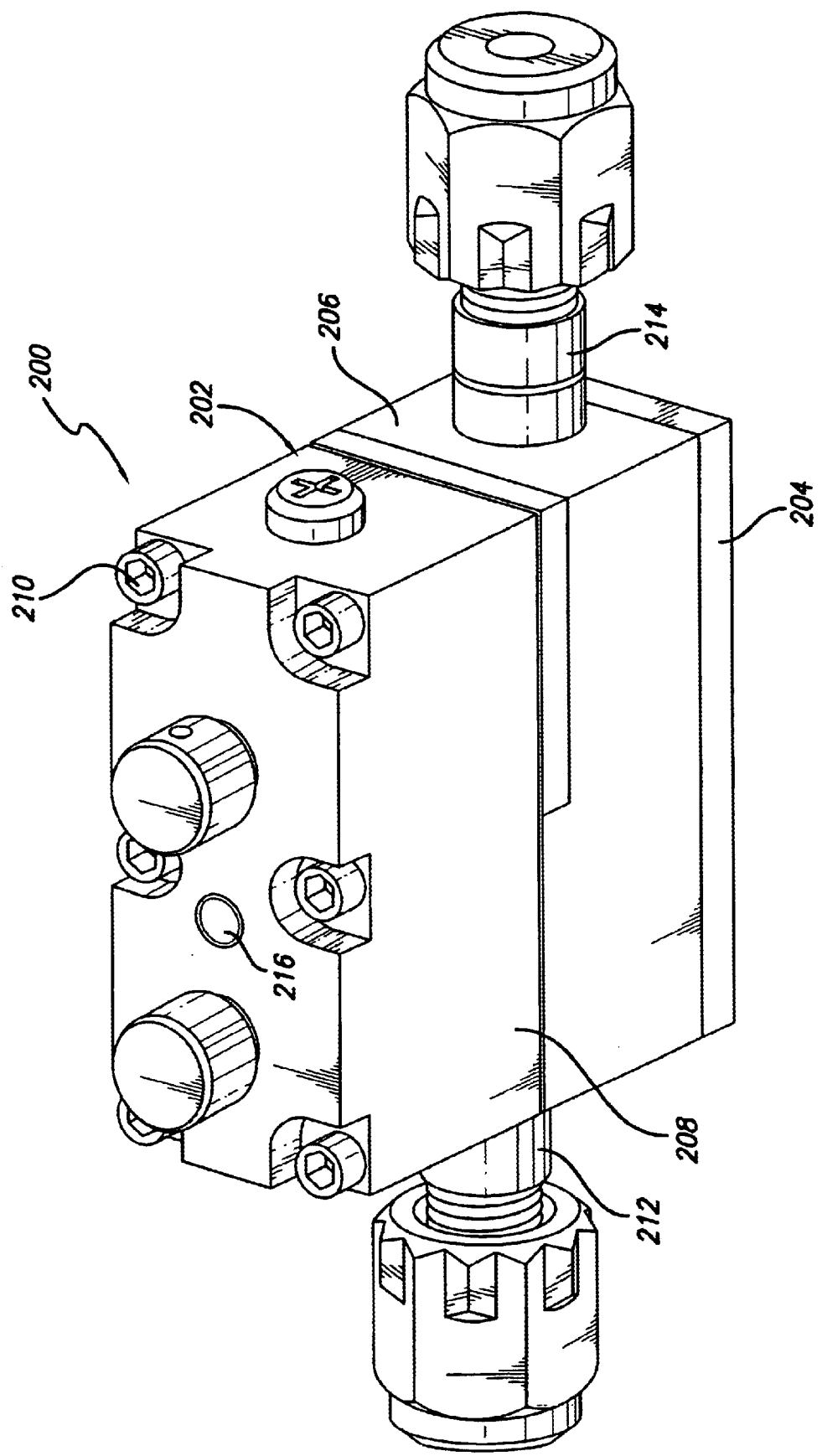
FIG. 4 is a perspective view of a second embodiment dispense valve constructed according to principles of the present invention.
Figure 5:
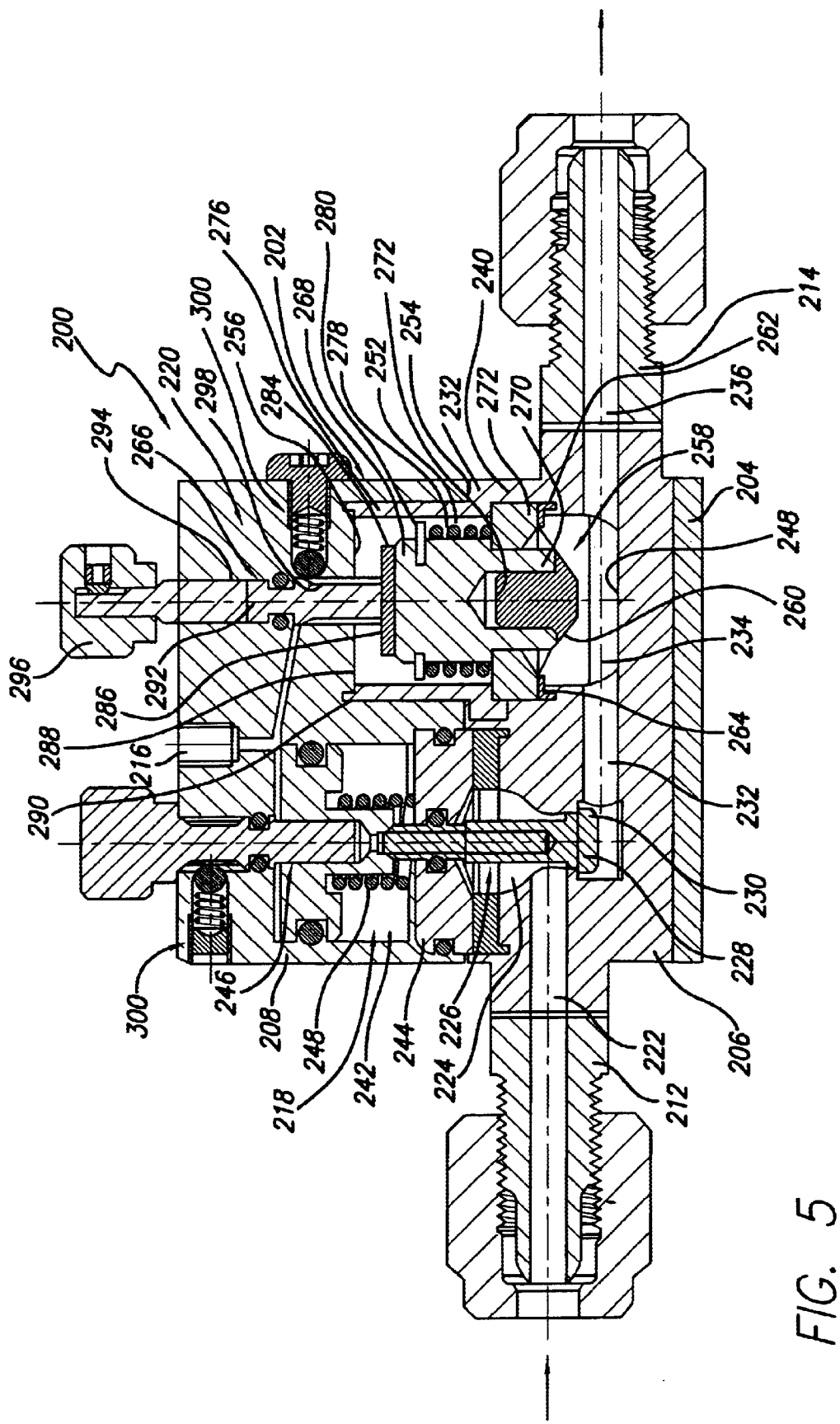
FIG. 5 is a cross-sectional side view of the dispense valve of FIG. 4 in a closed operating condition for controlling the displacement of fluid therethrough.

FIGS. 4 and 5 illustrate a second embodiment dispense valve 200 constructed according to principles of this invention, generally comprising a valve body 202 made up of, moving from the bottom of FIG. 4 upwardly, a base 204, a fluid transport housing (FTH) 206 disposed on top of the base 204, and an actuator housing 208 disposed on top of the FTH 206. Screws 210, or other suitable attachment means, extend through the actuator housing 208 and the FTH 206, and are threaded into the base 204 to attach the actuator housing 208 and FTH 206 thereto.

The FTH 206 includes a fluid inlet port 212 through one of its side walls, and a fluid outlet port 214 through an opposite side wall. In an air- or pneumatically-actuated embodiment of the dispense valve 200, the actuator housing 208 includes an inlet air port 216 and an air outlet port or vent (not shown) extending through its side wall. The FTH may also be configured having a leak detection port (not shown) extending through one of its side walls to monitor the occurrence of any fluid leakage within the dispense valve.

Generally speaking, the second embodiment dispense valve 200 differs from the first embodiment dispense valve in that the FTH and actuator housing are both configured to contain a second fluid transport system 220 that is positioned downstream of a first fluid transport system 218. The first fluid transport system 218 is configured identical to that of the first embodiment dispense valve described above and illustrated in FIGS. 1 and 2.

Moving downstream from the fluid inlet port 212, the FTH 206 comprises a fluid inlet passage 222 that is in fluid flow communication with the fluid inlet port and that empties into a first fluid transport chamber 224. The first fluid transport chamber is configured in the same manner as described above for the first dispense valve embodiment, comprising a diaphragm/poppet assembly 226 disposed therein that has a poppet 228 positioned to interact with a valve seat 230. The valve seat 230 is interposed between the fluid inlet passage 222 and an intermediate fluid passage 232.

The FTH includes a second fluid transport system 220 downstream from the intermediate fluid passage 232 comprising a second fluid transport chamber 234 that is in fluid flow communication with the intermediate fluid passage 232. The FTH includes a fluid outlet passage 236 that is downstream from the second fluid flow chamber 234 and that is in fluid flow communication with the fluid outlet port 214. The second fluid flow chamber 234 is generally cylindrical in shape and extends axially within the FTH from a closed base 238 to an oppositely oriented open end 240. Unlike the first fluid transport system 218, the second fluid transport system does not include a member that is designed to shut off or close the flow of liquid through the FTH. The FTH 206 can be made from the same materials discussed above in the first embodiment dispense valve.

The actuator housing 208 is attached to the FTH in the manner described above and is configured to accommodate the actuating members for both the first and second fluid transport systems. The actuator housing 208 comprises a first actuator or piston chamber 242 that contains the piston gland 244, the actuator piston assembly 246, the spring 248, and the detent assembly 250 each as described above and illustrated in FIG. 2 for the first embodiment dispense valve. The actuator housing 208 further comprises a second actuator chamber 252 that is separate and apart from the first actuator chamber 242. The second actuator chamber 252 comprises an open end 254 positioned adjacent the FTH and an axially opposed partially-closed end 256. The actuator housing 208 is formed from the same types of materials discussed above for the first embodiment dispense valve.

Moving upwardly in FIG. 4, starting in the second fluid transport chamber 234, the second fluid transport system 220 comprises a diaphragm 258 disposed across an open end of the second fluid transport chamber. The diaphragm 258 is in the form of a one-piece construction comprising a centrally positioned imperforate head 260, and a movable thin-walled section 260 extending radially outwardly a distance from the head. The diaphragm is defined along its radially outermost peripheral edge by a flange 262 that includes an axially projecting tongue 264 that is placed within a groove that is disposed circumferentially around the open end of the second fluid transport chamber 234. The tongue is configured having a thickness that is slightly larger than that of the groove width to provide a leak-tight interference fit with the FTH. The diaphragm, 258 is formed from the same type of material discussed above for the diaphragm/poppet assembly of the first embodiment dispense valve.

An actuator assembly 266 is positioned within the actuator housing 208 and in contact with the diaphragm 258. Moving upwardly from the diaphragm 258, the actuator assembly comprises a stem 268 that is disposed axially within the actuator chamber 252, and that includes a collar 270 at one axial end that is configured to cooperate with the diaphragm. Specifically, the collar is defined by a central opening 272 that is sized to receive an axially extending backside projection of the diaphragm head. The stem 268 comprises a first diameter section that defines an outside surface of the collar 270, and a second diameter section, extending axially away from the collar towards an opposite end of the stem, that is larger than the first diameter section. The stem can be formed from the same type of material disclosed above for the FTH, and in an example embodiment is formed from a metallic material, such as aluminum.

A support 274, in the form of an annular member, is disposed within the actuator chamber 252. The support has a central opening that accommodates placement of the stem collar therethrough, and extends radially between the stem collar and an edge of the FTH adjacent the open end 240. The support 274 is interposed axially between the diaphragm flange 262 on one side and a spacer 276 on an opposite side. The support can be formed from the same type of material disclosed above for the piston gland 244 in the first embodiment dispense valve. The spacer 276 will be described in detail below.

A spring 278 is disposed around the second diameter section of the stem 268, and is interposed axially between the support 274 at one of its axial ends, and an annular ring 280 at its other axial end. The annular ring 280 is retained within a groove in the stem second diameter section and projects radially outwardly therefrom a sufficient distance to provide a mounting surface for the spring. The spring is sized and configured to impose a desired spring force between the ring and support. Configured and assembled in this manner, the support 274 serves as a guide to the stem collar, a mounting surface for the diaphragm flange, and a mounting surface for the spring. In an example embodiment the spring and the retaining ring are each formed from a metallic material such as stainless steel.

The spacer 276 is a generally cone-shaped annular member that is disposed concentrically within the actuator chamber 252, and that is interposed axially between the FTH and the actuator housing. The spacer 276 includes a shoulder 282 that projects radially outwardly a distance from one axial spacer end, and that is interposed between opposed FTH and actuator housing open ends. The spacer 276 includes neck that extends axially away from the shoulder 282, that has a diameter smaller than the shoulder, and that fits concentrically within the side wall surface defining the actuator chamber 252. The neck includes an axial end that is positioned adjacent the actuator housing partially-closed end 256. Configured in this manner the spacer, when loaded into the actuator chamber 252, the serves to impose a desired an axially-directed loading force onto the support 274 at one axial end, and onto a mounting portion of a second diaphragm, at an opposite axial end, as will be better described below. The spacer can be formed from the same types of materials used to form the FTH. Neither the support nor the spacer, while disposed within the actuator chamber, are considered to be parts of the actuator assembly 266 because they are each static members within the actuator housing.

The actuator assembly 266 further comprises a second diaphragm 284 that is positioned within the actuator chamber 252 against an axial end of the stem 268 opposite the collar 270. The second diaphragm 284 includes a centrally located head 286, a thin-walled section 288 extending radially outwardly from the head, and a flange 290 defining a peripheral edge of the thin-walled section. The flange includes a tongue that projects axially outwardly therefrom and that is disposed within a groove disposed circumferentially around a diameter of the actuator housing partially-closed end 256. The tongue is sized having a thickness that is slightly greater than the width of the groove to provide a leak-tight interference fit therewith. The flange 290 is interposed between an axial end of the spacer 276 and the partially-closed end 256.

The second diaphragm serves to enable axial movement of the stem 268 within the actuator chamber while at the same time sealing off the remainder of the actuator housing from any potential fluid leaks within the actuator chamber. The second diaphragm can be formed from the same type of material used to form the diaphragm 258.

The actuator assembly 266 further comprises a shaft 292 that projects axially away from a surface of the second diaphragm 284 opposite the stem 268 through an opening 294 through the actuator housing 208. The shaft 292 includes a first axial end that is in contact with the second diaphragm, and a second axial end that projects outwardly from the actuator housing and that includes a knob 296 attached thereto. The shaft 292 includes one or more axially depending grooves 298 disposed therealong that are located adjacent a detent mechanism 300 that is disposed within a side wall section of the annular housing. The shaft can be formed from the same types of materials used to form the FTH, and can be formed from metallic materials if so desired.

The detent assembly 300 is configured in the same manner as that described above for the first fluid transport system for purposes of controlling the stroke of the shaft 292 and actuating assembly 266 within the second fluid transport system. The shaft also includes an O-ring seal disposed circumferentially therearound for purposes of providing a leak-tight seal between the shaft and the annular housing, and thereby containing pneumatic actuating pressure within the annular housing. The O-ring seal can be formed from the same types of materials disclose above for O-ring seals in the first embodiment dispense valve.

As mentioned briefly above, the annular housing 208 includes an air inlet port 216 for purposes of receiving pressurized actuating air. First and second air ports 302 and 304 are disposed within the annular housing and are in air flow communication with the air inlet port 216. The first air port 302 directs pressurized air into the piston chamber 242 for purposes of actuating the actuator piston assembly 246, and the second air port 304 directs pressurized air into the opening 298 for purposes of actuating the actuating assembly 266. Configured in this manner, air directed into the actuator housing via the air inlet port operates to actuate each first and second fluid transport system.

The second fluid transport system 266 operates to assist the first fluid transport system in the function of retaining and/or pulling back any volume of liquid remaining in the FTH after the first fluid transfer system has been placed in the closed position. Generally speaking, the second fluid transport system does this by retracting the diaphragm 258 within the second fluid transport chamber 234 shortly after the poppet 228 in the first fluid transport system is sealed against the valve seat 230. This timed retraction of the diaphragm serves to decrease the volume of the second fluid transport chamber, after the first fluid transport system is closed, thereby creating a slight suction that operates to retain or pull any remaining liquid in the fluid outlet passage 236 and fluid outlet port 214 back into the second fluid transport chamber 234.

The staged retraction of the diaphragm 258 after closure of the first fluid transport system can be achieved by a number of different methods. One method could be to provide differently timed actuation signals e.g., pneumatic charges, to the first and second actuation chambers. In a preferred embodiment, the first and second actuation chambers ire charged by a common air inlet port. Thus, in such preferred embodiment, the staged retraction is provided via use of different stroke lengths for the first and second actuator assemblies. In a preferred embodiment, the second actuator assembly is designed having a longer stroke than that of the first actuator assembly so that alter the first actuator assembly is activated to place the poppet in a closed position against the valve seat, the second actuator assembly baa not yet completed its stroke and still moves within the second fluid transport chamber to cause the desired volume decrease.

The ability to control the placement of liquid within the valve of this invention in the above-described manner, downstream of the valve seat, eliminates and/or greatly reduces the possibility of excess unwanted liquid leaving the valve after it has been closed. Thus, eliminating or greatly reducing the possibility of unwanted contamination resulting therefrom.

The above-identified members used to form first and second embodiment dispense valve embodiments of this invention made from polymeric materials can be formed by either mold or machine process, depending on both the specific type of material that is chosen and the project budget.

Accordingly, it is to be understood that, within the scope of the appended claims, dispense valves constructed according to principles of this invention may be embodied other than as specifically described herein.

What is claimed is:

1. An anti-pumping dispense valve comprising:
   a fluid transport housing having a fluid inlet passage extending into the housing, a fluid outlet passage extending out of the housing, and a fluid transport chamber disposed within the housing and in fluid-flow communication with the fluid inlet and fluid outlet passages;
   a valve seat integral with the fluid transport chamber and interposed between the fluid inlet passage and fluid outlet passage;
   a one-piece diaphragm/poppet assembly disposed within the fluid transport chamber comprising:
      a imperforate poppet head at one axial end of the assembly and positioned within the fluid transport chamber downstream from the valve seat for placement against the seat to stop fluid flow through the fluid transport chamber; and
      a flexible diaphragm at an opposite axial end of the assembly and extending radially outwardly from the assembly;
   an actuator housing attached to the fluid transport housing and including an actuator piston assembly disposed therein that is in contact with the diaphragm/poppet assembly for moving the diaphragm/poppet assembly within the fluid transport chamber; and
   means for adjusting the actuator piston assembly stroke length disposed within the actuator housing.

2. The dispense valve as recited in claim 1 wherein the actuator piston assembly comprises:
   a piston disposed at one axial end of the actuator housing, the piston being axially movable within the actuator housing;
   an annular gland disposed at an opposite axial end of the actuator housing adjacent the fluid transport housing; and
   a spring interposed axially between the piston and the gland.

3. The dispense valve as recited in claim 2 wherein the actuator piston assembly further comprises means for connecting the piston to the diaphragm/poppet assembly.

4. The dispense valve as recited in claim 3 wherein the means for connecting is a common shaft.

5. The dispense valve as recited in claim 1 wherein the actuator piston assembly comprises a shaft that is disposed through the actuator housing, and wherein the means for adjusting comprises a detent mechanism disposed within the actuator housing that is configured to cooperate with the shaft.

6. An anti-pumping dispense valve comprising:

a fluid transport housing having a fluid inlet passage extending into the housing, a fluid outlet passage extending out of the housing, a fluid transport chamber disposed within the housing and interposed between the fluid inlet and fluid outlet, the fluid transport chamber including an integral valve seat;

an actuator housing attached to the fluid transport housing and including an actuator chamber in contact with the fluid transport chamber;

a one-piece diaphragm/poppet assembly disposed within the fluid transport chamber comprising:

a poppet having a head that is positioned downstream of the seat; and a movable diaphragm that is positioned upstream of the valve seat;

actuator means disposed within the actuator chamber for moving the diaphragm/poppet assembly.

7. The valve as recited in claim 6 wherein the movable diaphragm is integral with the poppet, and wherein the diaphragm /poppet assembly includes a flange that forms a leak-tight seal with the fluid transport housing.

8. The valve as recited in claim 6 wherein the actuator means comprises an actuator assembly that forms a leak-tight seal within the actuator chamber to facilitate actuation movement, and wherein the actuator assembly is biased into a nonactuated state by a spring member that is disposed in the actuator chamber.

9. The valve as recited in claim 6 wherein the poppet head is imperforate.

10. The valve as recited in claim 6 wherein the diaphragm/poppet assembly is fixedly attached to the actuating means.

11. A dispense valve comprising:

a fluid transport housing having a fluid transport chamber interposed between a fluid inlet passage into the housing and a fluid outlet passage out of the housing, the fluid transport chamber including a valve seat interposed between the fluid inlet and outlet passages;

an actuator housing connected with the fluid transport housing and including an actuator chamber connected with the fluid transport chamber;

an actuator assembly disposed within the actuator chamber;

a diaphragm/poppet assembly in contact with the actuator assembly and disposed within the fluid transport chamber, the diaphragm/poppet assembly comprising:

an elongate shaft defined by opposed first and second axial ends;

a poppet head portion that is integral with a first end of the shaft and that is positioned downstream of the seat and in sealing communication with the seat when the valve is placed in a closed position; and a movable diaphragm that is positioned at the second end of the shaft on a side of the valve seat opposite from the head portion;

means for controlling movement of the actuator assembly to move the poppet against the valve seat.

12. The valve as recited in claim 11 wherein the means for controlling the movement of the actuator comprises a detent mechanism disposed within the actuator housing, and that register with a portion of the actuator assembly.

13. The valve as recited in claim 11 wherein the poppet is positioned at one axial end of a diaphragm/poppet assembly comprising a movable diaphragm disposed at an opposite axial end, the movable diaphragm including a flange along a peripheral edge that forms a leak-tight with the fluid transport housing.

14. The valve as recited in claim 13 wherein the diaphragm/poppet assembly is a one-piece construction, and the poppet is imperforate.

15. The valve as recited in claim 13 wherein the diaphragm/poppet assembly comprises a hollow channel that extends axially partially through the assembly, and wherein the diaphragm/poppet assembly is attached to the actuator assembly by use of a common shaft that extends between the actuator assembly and the into the channel.

16. The valve as recited in claim 11 wherein the actuator assembly comprises a shaft that extends axially into the actuator housing, an annular piston and a piston gland that are each positioned within the annular chamber and disposed around different sections of the shaft, and a spring that is disposed within the actuator housing and that is interposed axially between the annular piston and piston gland to urge the poppet against the seat.

17. The valve as recited in claim 11 wherein the actuator housing includes an air inlet port for receiving an actuating pressurized stream of air, and an air distribution port for directing the actuating air into the actuator chambers.

18. The valve as recited in claim 13 wherein the diaphragm/poppet assembly is formed from a fluoropolymeric material.

* * * * *